Jan. 21, 1964  K. SCHRÖTER ETAL  3,118,292
OVERLOAD CLUTCH

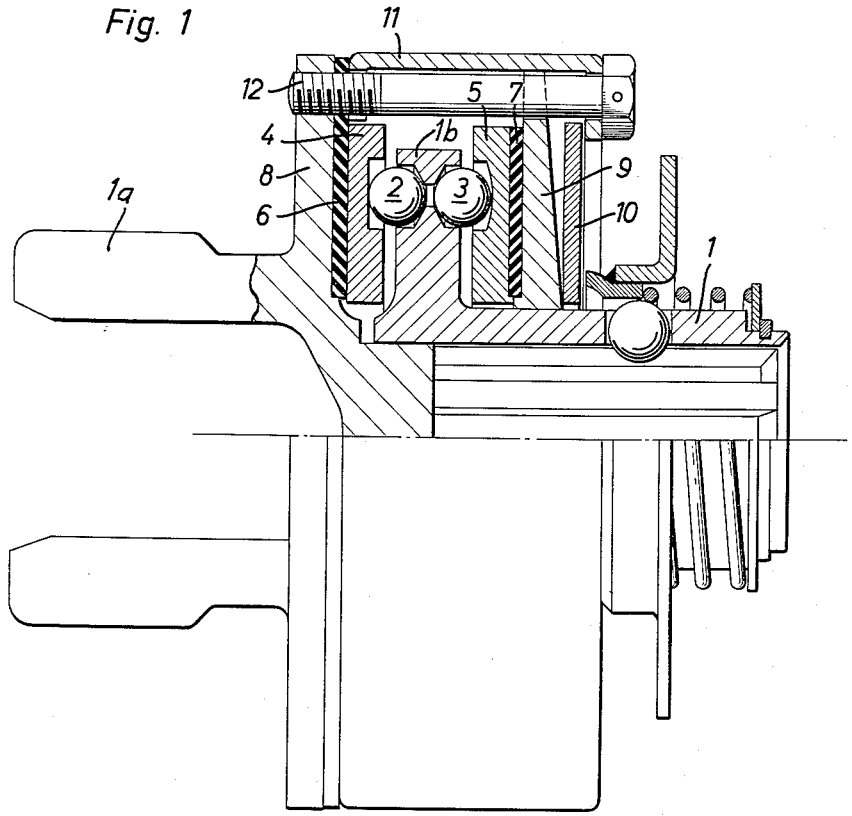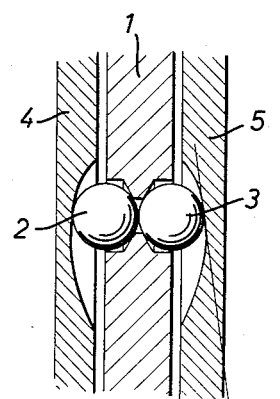

Filed Dec. 5, 1960  5 Sheets-Sheet 3

Inventors

KURT SCHROTER
BERNHARD WALTERSCHEID-MULLER

By Toulmin & Toulmin
Attorneys

United States Patent Office 3,118,292
Patented Jan. 21, 1964

3,118,292
OVERLOAD CLUTCH
Kurt Schröter and Bernhard Walterscheid-Müller, Lohmar, Germany, assignors to Jean Walterscheid Kommanditgesellschaft, Lohmar, Germany
Filed Dec. 5, 1960, Ser. No. 73,797
Claims priority, application Germany Dec. 3, 1959
9 Claims. (Cl. 64—30)

The present invention relates to friction clutches and more in particular to overload friction clutches.

It has become known to provide overload friction clutches actuated by resilient means exerting a resilient force, varying with changing torque and compensating variations in friction value. These known clutches are, however, unsatisfactory because the possible range of compensation is comparatively small and the required resilient means are undesirably large and cumbersome. In addition, wear of the friction couplings reduces the contact pressure and increasing wear tends to reduce the transmitted torque.

It is an object of the present invention to provide an overload friction clutch wherein substantially the full torque is maintained after passing the marginal torque.

It is another object of the present invention to provide an overload friction clutch wherein variations of the friction value at the friction surfaces of the coupling member do not cause any change of the transmitted torque, without rendering the pressure-producing resilient means unduly large and cumbersome.

These objects are achieved by the invention according to which the resilient means actuating the friction coupling members have a characteristic resilient force/resilient excursion or displacement curve with a first ascending and a second descending portion, and wherein the resilient means are initially pretensioned with a value from the range of the descending portion, so that any increased deformation of the resilient means caused by increased friction value will result in a drop of the resilient force.

According to a further advantageous feature of the invention spreading means are provided causing further deformation of the resilient means under the influence of increasing friction values.

The friction overload clutch of the present invention offers numerous advantages. A uniform torque is maintained after exceeding a marginal torque. The resilient means are small and unobstructive, and the overall size of the clutch is greatly reduced. The variations in friction values are compensated. In addition, variations in centrifugal forces are compensated. Any wear of the friction coupling surfaces does not influence the marginal torque because the resilient means will expand due to wear, thereby increasing the contact pressure.

Further modifications and embodiments of the present invention will become apparent upon reading the following detailed description.

The invention will be more fully appreciated upon the following description of the accompanying drawings, wherein, FIGURE 1 is a side elevational partly sectional view of a friction disk clutch according to the invention;

FIGURE 2 is a fragmentary view of the spreading member as used in the coupling of FIGURE 1;

Figure 3:
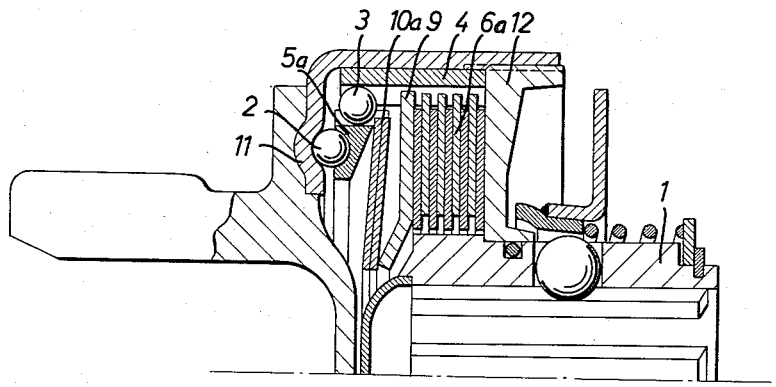
FIGURE 3 is a side elevational partly sectional view of a lamination coupling according to the invention.
Figure 4:
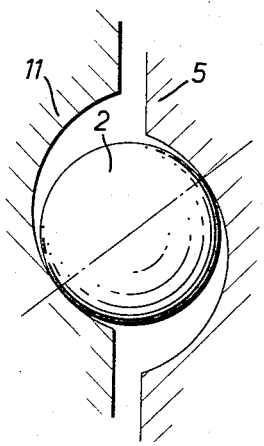
FIGURE 4 is a fragmentary view of a spreading member as used in the coupling of FIGURE 3.

The friction disk coupling of FIGURE 1 comprises a driven member such as hub 1, and a driving member 1a. Hub 1 has a flange portion 1b with a plurality of peripheral recesses receiving axially displaceable balls 2, 3 abutting against recesses 4a and 5a in coupling disks 4 and 5. The coupling disks 4, 5 are rotatably positioned partly on the driven hub 1 and partly in a housing or casing 11 extending about hub 1. It will be noted that the recesses 4a and 5a preferably have a curved configuration as illustrated in FIGURE 2.

Friction disk 4 engages a friction lining 6 abutting against a flange 8 of driving member 1a, and friction disk 5 engages a friction lining 7 abutting against a support disk 9 which latter is rotatable and axially displaceable on hub 1, and non-rotatably but axially displaceably positioned in casing 11.

Casing 11 and support disk 9 define a space housing a resilient member such as plate spring 10 thrusting against support disk 9 and thereby exerting pressure against coupling disks 5 and 4. The resilient member, e.g. plate spring 10 has a characteristic illustrated by the resilient force spring excursion diagram of FIGURE 5, with a first, ascending portion and a second, descending portion.

Figure 5:
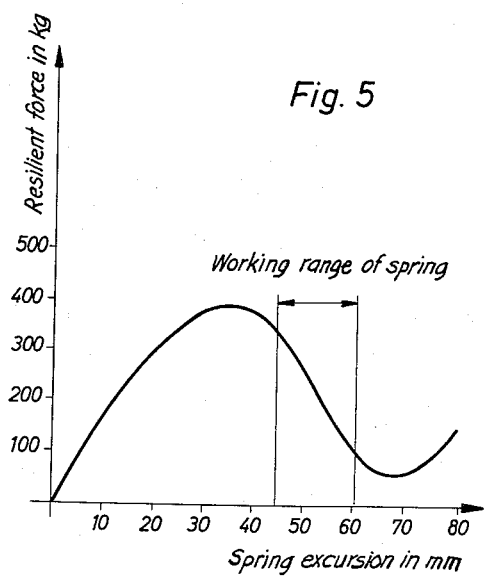
FIGURE 5 is a diagram of the characteristic line of a plate spring as used in the clutch according to the invention.

There are further provided means for varying the pretension of plate spring 10, comprising e.g. three adjusting screws 12 connecting casing 11 with flange 8, so that, by turning the screws 12, the space between casing 11 and support disk 9 housing the plate spring 10 can be varied, thereby adjusting the pretension of spring 10. According to an important feature of the invention, the pretension of spring 10 is so selected, that it has a value positioned on the second, descending portion of the resilient force/spring excursion characteristic, as illustrated in FIGURE 5. By virtue of this pretension, the resilient force of spring 10 will decrease if, in the course of operation of the clutch, the space housing the spring is made smaller and the spring is compressed.

According to the embodiment of the invention illustrated in FIGURE 3 the casing 11 houses a plurality of laminations meshing, on the one hand, with an external annular ribbing of hub 1, and, on the other hand, with an internal annular ribbing of a follower ring 4. A multiple-part plate spring 10a thrusts against the support disk 9 and thereby exerts pressure against the laminations 6a. Spring 10a is contacted by a pressure ring 5a having recesses receiving balls 2 abutting against corresponding recesses in casing 11. The pretension of spring 10a can be adjusted by a screw ring 12 screwed into an internal threading of casing 11.

It will be noted, that the characteristic of spring 10a is analogous to the characteristic of spring 10, illustrated in FIG. 5, with a first, ascending portion and a second, descending portion, and the pretension being selected to have a value in the range of the descending portion.

The clutch of FIG. 1 operates as follows: A rising friction value will cause the friction disks 4, 5 to be moved further apart by the balls 2, 3 thereby compressing plate spring 10. Due to the selected pretension of spring 10 the contact pressure exerted by spring 10 drops.

On the other hand, a decreasing friction value causes a diminishing compression of spring 10 which, in turn, results in a mounting resilient force produced by spring 10. In either instance, the pretension of spring 10 is thus varied by a displacing action of the spreading means 2, 3, 4, 5 so as to maintain the product of friction value and contact pressure constant.

It will be appreciated that the particular characteristic of spring 10a as well as the spreading distance of the spreading means (i.e. balls 2, 3, disks 4, 5) will be selected with a view to the possible variations of the friction value. By a proper selection, and due to the aforementioned operation it becomes possible to maintain the product of friction value and contact pressure of spring 10 constant.

Figure 6:
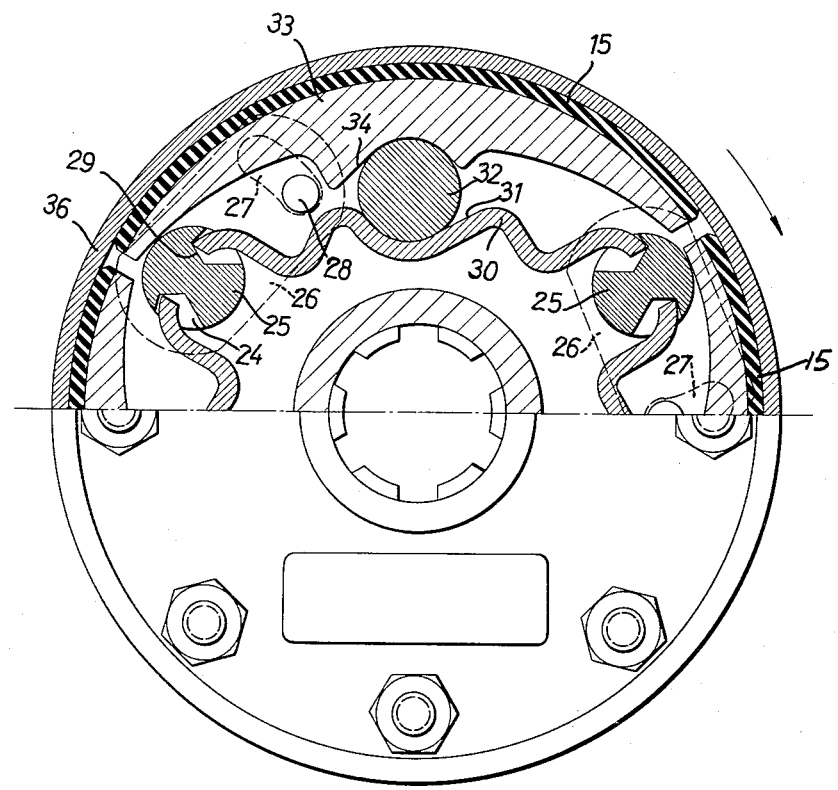
FIGURE 6 is a front view, partly in section of a friction jaw coupling according to the invention.
Figure 7:
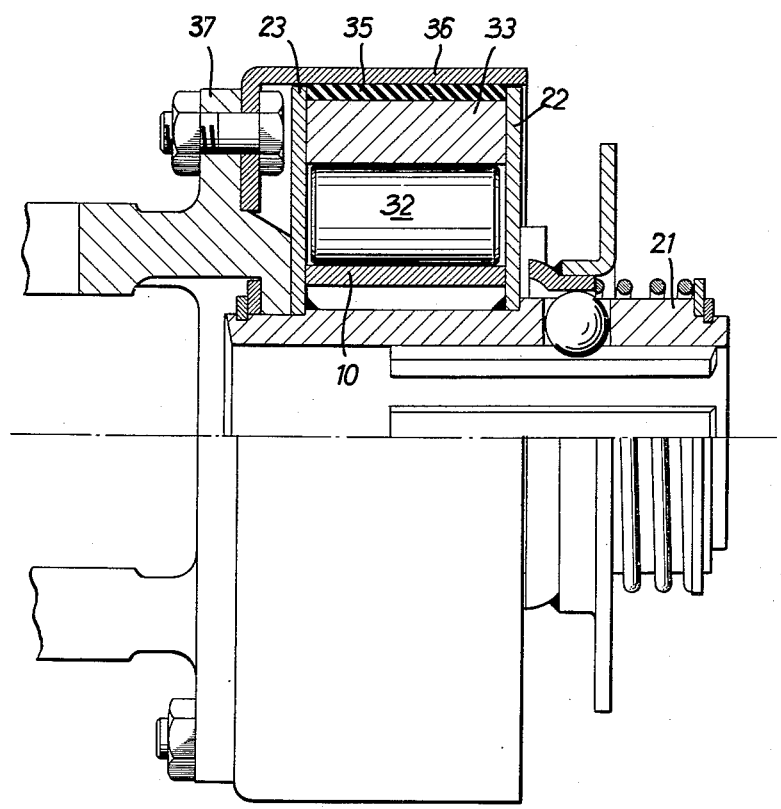
FIGURE 7 is a side elevational view partly in section of the coupling of FIGURE 6.

The embodiment of FIGS. 6 and 7 illustrates the invention with respect to a friction jaw coupling. The driven member consists of a wedge-shaped hub 21 which may be coupled with the driving member 37 by a friction jaw coupling to be described presently. A pair of cover plates 22, 23, are connected with hub 21, e.g., by welding. The plates 22, 23 have a plurality of borings 24 receiving bearing bolts 25, having adjusting levers 26 connected with threaded bolts 28 guided in slot guides 27, whereby the bearing bolts 25 can be adjusted and secured. The bearing bolts 25 have notches 29 which serve as abutments for the respective ends of corrugated blade springs 30. Substantially with its central portion a concave surface portion 31 of blade spring 30 thrusts against a roller body 32, thus urging the roller body 32 against a recess 34 of friction jaws 33 having a friction lining 35 adjacent a casing 36 connected with the driving member 37 by suitable connecting means such as screws.

It will be appreciated that due to its abutment against bearing bolts 25 on the one hand, and friction jaws 35 on the other hand, the blade spring 30 is pretensioned both with respect to its longitudinal axis and with respect to its transverse axis.

It will be noted, that according to an important feature of the invention, the blade spring has a characteristic similar to that of FIGURE 5 with an ascending and a following descending portion, and that the initial pretension is selected from the range of the descending portion. Furthermore, the respective abutting portions of the blade spring and the friction jaw contacting the roller body 32 are so chosen, i.e. so curved, that a clockwise displacement of the friction jaws 33 will change the pretension of blade spring 30 to such lower value that the product of friction value and contact pressure is maintained constant.

The operation of this embodiment of the invention is as follows:

An increasing friction value is transmitted to the friction jaws 33 by lining 35, and the friction jaws 33 turn clockwise, as a result of which the blade springs 30 are bent radially inwardly via the roller bodies 32, causing a decrease of contact pressure exerted by the blade springs. A decrease of the friction value reduces the aforementioned thrust thereby increasing the contact pressure exerted by the blade springs. In both instances the product of friction value and contact pressure is maintained constant.

It will be noted that in addition to changing friction values, variations in centrifugal forces are also compensated.

The spring characteristic is preferably so chosen that any wear of the spring body and subsequent changes in pretension do not prejudice the compensating action of the spring.

Figure 8:
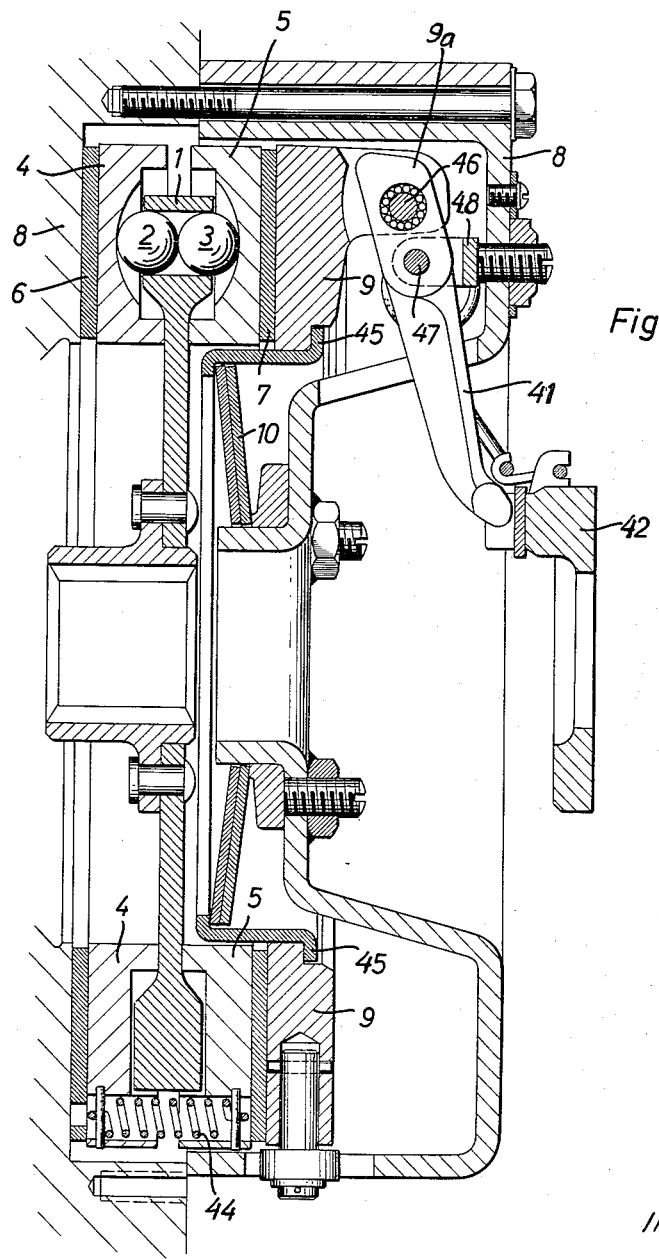
FIGURE 8 is a sectional view of a shifting coupling according to the invention.

According to still a further embodiment illustrated in FIGURE 8, wherein like reference numerals illustrate the same parts as in FIGURE 1, the supporting disk 9 has extended portions 9a upon which are mounted adjusting levers 41 pivotable about pivot studs 46. The adjusting levers 41 are supported against casing 48 by means of studs 47 and an adjustable fork 48. The adjusting levers can be operated in a known manner by slide rings 42. The coupling disks 4, 5 have friction linings 6, 7, and are connected with each other by tension springs 44. Plate spring 10 is provided between coupling disks 4, 5 and is supported on disk 9 by an annular connecting member 45.

The operation of the FIGURE 8 embodiment is the same as described with reference to the embodiments of FIGURES 1 and 3, however, the provision of the adjusting levers 41 and the associated structure enable a voluntary disengagement of the clutch at any desired moment. This disengagement is effected by axially displacing the slide ring 42, thereby pivoting the adjusting lever 41. As a result, the spring 10 no longer causes a sufficient compression of friction linings 6, 7 and consequently no torque is transmitted. At the same time, the tension springs 44 draw the friction disks 4, 5 towards one another, so as to obtain a frictionless operation of the clutch. In addition, the tension springs 44 reduce friction between friction disks 4, 5 and hub 1 in the idling position.

It will be understood that this invention is susceptible to modification in order to adapt it to different usages and conditions and, accordingly, it is desired to comprehend such modifications within this invention as may fall within the scope of the appended claims.

What we claim is:

1. Overload friction clutch for coupling a driving member and a driven member, comprising a first friction coupling disk adjacent said driving member, a second friction coupling disk for coupling engagement with said driven member, spreading means between said first and second coupling disk linking the same with one another and capable of moving the same further apart under the influence of increasing torque, resilient means in operative engagement with said second coupling disk so as to urge the same towards said first coupling disk and being further compressed whenever said spreading means move said first and said second coupling disks apart, said resilient means having a resilient force/excursion characteristic with a first, ascending portion, and a second, descending portion, and being initially pretensioned with a value from the range of said descending portion, so that any further compression will lessen the resilient force exerted by said resilient means on said coupling means.

2. Overload clutch according to claim 1, said resilient means and said spreading means being so dimensioned that, under all operative conditions of said clutch, the product of friction value and contact pressure exerted by said resilient means remains constant.

3. Overload friction clutch for coupling with and driving a hub-shaped driven member comprising a driving member carrying a radial flange and a cylindrical casing, a support disk axially movable in and rotatable with the casing, a flange portion on the driven member in the space between the radial flange and the support disk, a friction disk on each side of the flange, spreading means carried by the flange portion for acting upon the disks to spread them apart upon relative rotation of said flange portion and said friction disks, resilient means pressing against the support disk to urge it against the friction disks, said resilient means having a resilient force/excursion characteristic with a first, ascending portion, and a second, descending portion, and being initially pretensioned with a value from the range of said descending portion, so that any further compression will lessen the resilient force exerted by said resilient means on said coupling means, said resilient means and said spreading means being so dimensioned that, under all operative conditions of said clutch, the product of friction value and contact pressure exerted by said resilient means remains constant.

4. Overload clutch according to claim 3, said spreading means comprising a flange portion of said driven member extending between said first and second coupling disks, a plurality of recesses on either side of said flange portion, a plurality of corresponding recesses in said first and second coupling disks on the respective sides of the latter facing said flange portion, and a plurality of balls in said recesses of said flange portion and said coupling disks.

5. Overload clutch according to claim 4, with said recesses in said coupling disks having a curved configuration.

6. Overload clutch according to claim 3, with said resilient means being a plate spring.

7. Overload clutch according to claim 3, further comprising means for adjusting the pretension of said resilient means.

8. Overload friction clutch for coupling a driving member and a driven member, having an external ribbing, comprising a casing about said driven member, a follower ring connected with said casing and having an internal ribbing, a lamination-type coupling body meshing with the external ribbing of said driven member and the internal ribbing of said follower ring, a support disk contacting said coupling body, a plate spring having a first face urging said support disk against said coupling body, spreading means urged against said plate spring opposite said first face by said driving member, said plate spring having a resilient force/excursion characteristic with a first, ascending portion, and a second, descending portion, and being initially pretensioned with a value from the range of said descending portion, so that any further compression will lessen the resilient force exerted by said plate spring on said coupling body.

9. Overload friction clutch comprising a driving member and a driven member, a casing on one of said members and a hub on the other member extending into said casing, a support disk in the casing and rotatable therewith but movable axially relative to the casing, friction disks rotatable with the hub but movable axially relative thereto and adapted to frictionally engage the support disk, and a plate spring pressing laterally against the support disk while reacting against the member that carries the casing, said spring having a resilient force excursion characteristic with a first ascending portion and a second descending portion and being initially pretensioned with a value from the range of said descending portion so that any further deformation will lessen the resilient force exerted by said spring against the support disk.

References Cited in the file of this patent

UNITED STATES PATENTS

| | | |
|---|---|---|
| 2,151,724 | Wengel et al. | Mar. 28, 1939 |
| 2,230,520 | Wemp | Feb. 4, 1941 |
| 2,407,022 | Lambert | Sept. 3, 1946 |
| 2,720,943 | Kershner et al. | Oct. 18, 1955 |